US00RE36645E

United States Patent [19]

Davis

[11] E Patent Number: Re. 36,645

[45] Reissued Date of Patent: Apr. 4, 2000

[54] METHOD AND APPARATUS FOR REMOVING A HIDE FROM A BACK PORTION AND TAIL OF A CARCASS

[75] Inventor: Albert D. Davis, Greeley, Colo.

[73] Assignee: Monfort, Inc., Greeley, Colo.

[21] Appl. No.: 08/391,491

[22] Filed: Jan. 19, 1995

Related U.S. Patent Documents

Reissue of:

[64] Patent No.: 5,180,328
Issued: Jan. 19, 1993
Appl. No.: 07/695,266
Filed: May 3, 1991

[51] Int. Cl.[7] ..... A22B 5/16

[52] U.S. Cl. ..... 452/128; 452/187

[58] Field of Search ..... 452/125, 128, 452/187

[56] References Cited

U.S. PATENT DOCUMENTS

| | | | |
|---|---|---|---|
| 2,696,633 | 12/1954 | Hincks | 452/128 |
| 2,897,537 | 8/1959 | Schmidt, Jr. | 452/128 |
| 3,281,891 | 11/1966 | Dethloff et al. | 452/128 |
| 3,541,637 | 11/1970 | Robison et al. | 452/128 |
| 3,545,037 | 12/1970 | Anderson | 452/128 |
| 3,737,949 | 6/1973 | Davis . | |
| 3,835,502 | 9/1974 | Thompson et al. | 452/128 |
| 3,863,294 | 2/1975 | Barbee . | |
| 3,895,416 | 7/1975 | Haws . | |
| 4,229,860 | 10/1980 | Irwin . | |
| 4,307,490 | 12/1981 | Watkins et al. . | |
| 4,320,559 | 3/1982 | Couture . | |
| 4,392,274 | 7/1983 | Noroy . | |
| 4,417,367 | 11/1983 | Leining . | |
| 4,438,546 | 3/1984 | Couture . | |
| 4,653,149 | 3/1987 | Swilley . | |
| 4,707,885 | 11/1987 | Swilley . | |
| 4,751,768 | 6/1988 | Trujillo, Sr. . | |
| 4,873,749 | 10/1989 | Couture . | |
| 4,934,027 | 6/1990 | Kjorum et al. . | |
| 5,087,222 | 2/1992 | Sterling et al. | 452/187 |

FOREIGN PATENT DOCUMENTS

| | | | |
|---|---|---|---|
| 365453 | 4/1990 | European Pat. Off. | 452/187 |
| 2151125 | 7/1985 | United Kingdom | 452/130 |

*Primary Examiner*—Willis Little
*Attorney, Agent, or Firm*—Sheridan Ross P.C.

[57] ABSTRACT

An apparatus (10) and method for removing a hide (14) from a back portion of a carcass (12) is provided. The apparatus (10) comprises first and second peeling members (18 and 20) pivotally mounted on a frame (28). The members are positionable to enter a gap (22) between the carcass (12) and the hide (14) due to carcass (12) movement. The back portion of the hide (14) is removed by pivoting the members (18 and 20) to peel the hide (14).

36 Claims, 6 Drawing Sheets

METHOD AND APPARATUS FOR REMOVING A HIDE FROM A BACK PORTION AND TAIL OF A CARCASS

Matter enclosed in heavy brackets [ ] appears in the original patent but forms no part of this reissue specification; matter printed in italics indicates the additions made by reissue.

TECHNICAL FIELD OF THE INVENTION

This invention relates in general to processing animal carcasses in a slaughterhouse, and in particular to a method and apparatus for removing the hide from a back portion and tail of a carcass.

BACKGROUND OF THE INVENTION

In a slaughterhouse processing line, the hide is commonly removed from a carcass by a downpuller. Typically, the carcass is suspended by its hind legs from a conveyor and transported to the downpulling station. At the downpulling station, the downpuller grips a previously detached portion of the hide and pulls downwardly thereon forcibly pulling the hide from the carcass. The downpuller may remove the entire hide by pulling the hide over the carcass' head.

In preparation for the downpulling station, the hide may be detached from various portions of the carcass. Although some of this preparation may be mechanized, the preparation generally involves the manual services of several operators using sharp instruments. The preparation may include the following steps: cutting the hide along the underside of the carcass to provide side flaps; pulling the side flaps around the sides of the carcass leaving the hide attached to the back portions of the carcass; and removing the hide from the tail and back portions so that the hide remains attached only to the head and shoulder region and, perhaps, the front legs of the carcass. A downwardly hanging portion of the hide is thereby provided for the downpuller to grip and pull. The present invention relates to the last of the prepatory steps, that is, removing the hide from the tail and back portions of the carcass.

In some slaughterhouses, the hide has been removed from the tail and back portions by operators using rotary knives or other trimming tools. This method is objectionable for a number of reasons. First, in order to keep pace with the processing line, several operators may be required. Each of these operators is subjected to a unpleasant and frequently dangerous working environment. In addition, waste may result due to excessive meat removal by the trimming tools. Moreover, handling by several operators creates the danger of food product contamination as well as an increase in the cost of processing.

Thus, there is a need for a method and apparatus for removing a hide from the tail and back portions of a carcass which reduces hazardous working conditions and cost. Preferably, such a method and apparatus would reduce manual handling thereby reducing the likelihood of contamination. In addition, there is a need for such a method and apparatus to reduce or substantially eliminate wastage due to excessive meat removal by trimming tools. There is also a need for such a method and apparatus which can keep pace with other processing stations so that plant capacity is not thereby limited.

SUMMARY OF THE INVENTION

The present invention disclosed herein comprises a method and apparatus for removing a hide from a back portion and tail of a carcass. The present invention substantially reduces handling associated with removing a hide from a carcass and back portion and tail thereby reducing hazardous working conditions. The present invention also reduces the likelihood of product contamination and increases operating line efficiency.

According to one aspect of the present invention a method and apparatus for removing a hide from a carcass back portion and tail is provided. First and second members of a hide removal assembly enter into a gap previously formed between the carcass and the hide. The gap is located generally on the back portion of the carcass between the carcass' neck and tail and, preferably, near the small of the back. As used herein, the phrase "small of the back" refers to the concavity between the carcass' shoulder and hip regions when the carcass is suspended substantially vertically, for example, by its hind legs. After entering the gap, the first member is moved towards the carcass' tail and the second member is moved towards the carcass' neck thereby peeling the hide from the tail and back portions of the carcass.

According to another aspect of the present invention, a method and apparatus for removing a hide from the tail and back portions of a carcass suspended from a moving conveyor is provided. The carcass is suspended from the carcass conveyor so that it hangs longitudinally. A gap is formed between portions of the carcass and the hide generally in an area between the tail and neck and, preferably, near the small of the back. First and second elongated members of a hide removal assembly are positioned so that they enter the gap due to movement of the carcass along the conveyor. The first and second members are pivotally moved, the first member towards the tail and the second member towards the neck, thereby peeling the hide from the carcass. The first member and second member may also be simultaneously moved away from the carcass to reduce the tendency of the tail to flip and to reduce undesired fat removal from the carcass.

It is a technical advantage of the present invention that a method and apparatus for removing a hide from a carcass back portion and tail is provided which reduces manual handling thereby reducing hazardous working conditions and labor requirements. It is a further technical advantage of the invention that the likelihood of product contamination is reduced and efficiency is enhanced.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
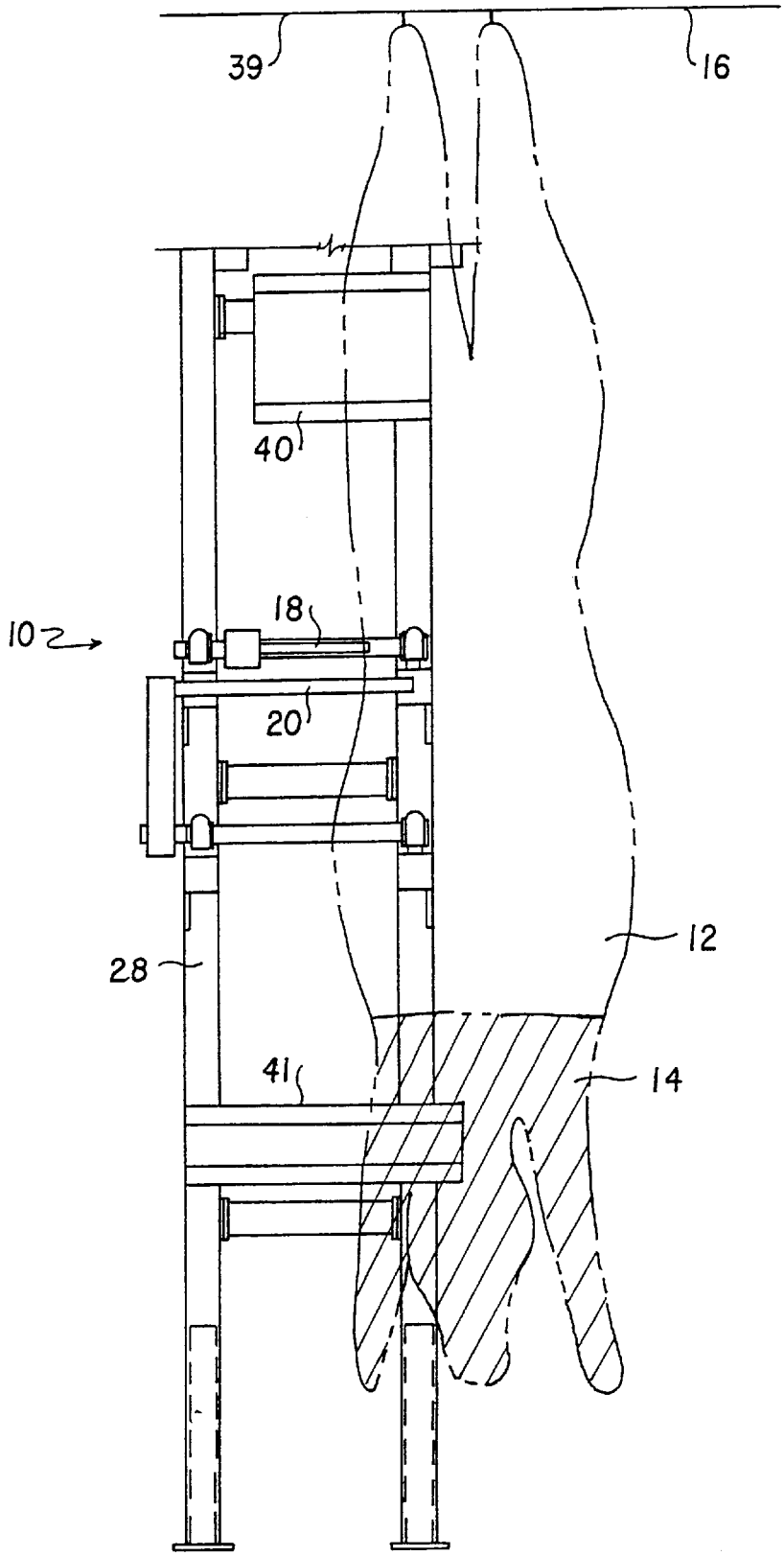
FIG. 1 is a front elevation of an apparatus constructed in accordance with an embodiment of the present invention.
Figure 2:
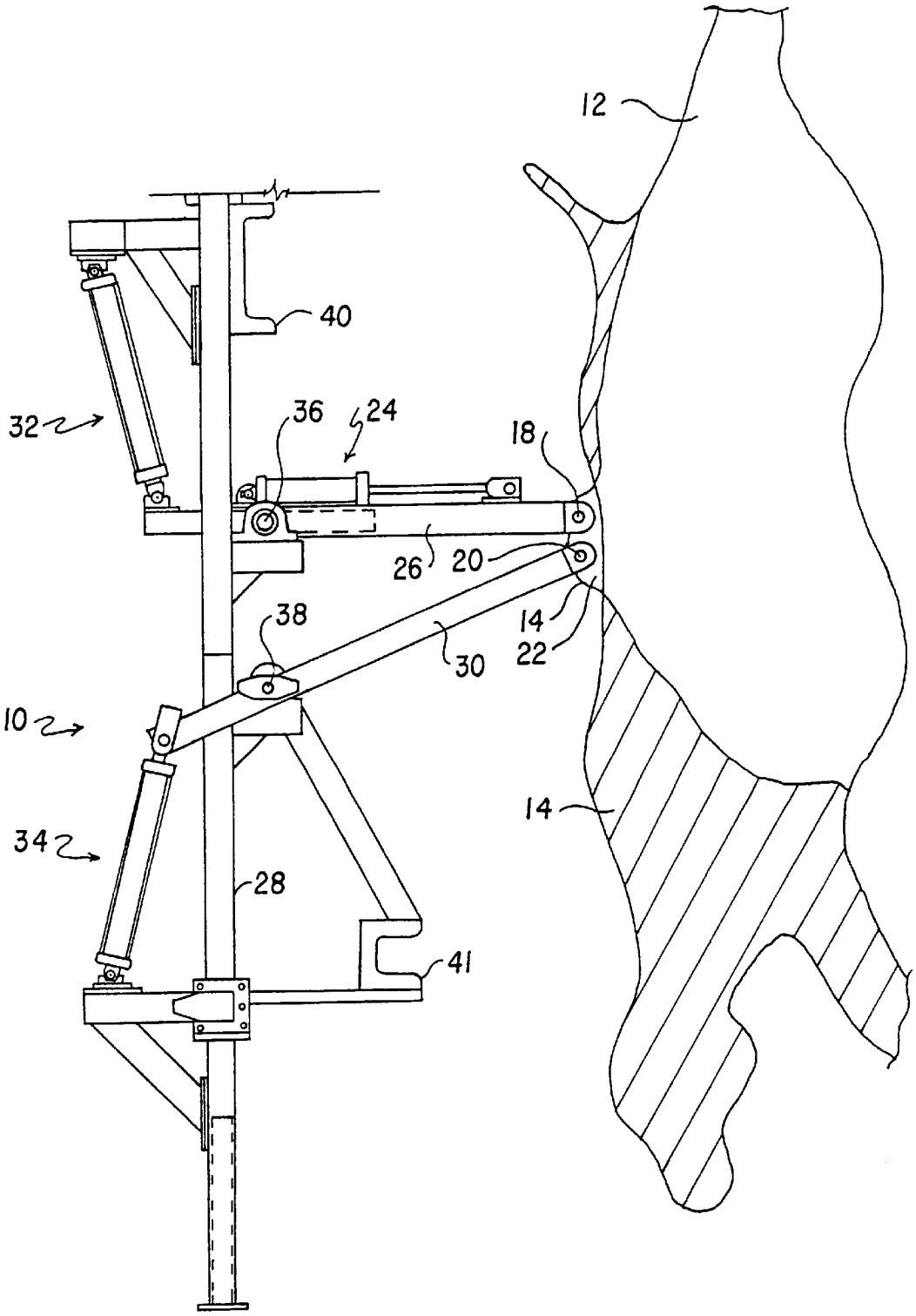
FIG. 2 is a side elevation of the apparatus of FIG. 1.

In FIGS. 1–5 like items are identified by like and corresponding numerals for ease of reference. Referring first to FIGS. 1 and 2, front and side views, respectively, of an apparatus constructed in accordance with an embodiment of the present invention are generally identified by the reference numeral 10. The apparatus 10 is employed as part of a hide removal station in a slaughterhouse processing line. Before reaching the hide removal station, a carcass 12 may be processed at a number of preliminary stations including: a stunning station where the animal, for example a cow, is immobilized; a slaughter station where the animal is dispatched; a station where the carcass 12 is bled, for example, by cutting arteries in the neck region and inverting the carcass 12; and a preliminary hide pulling station where the hide 14 is detached from the rear legs and side of the carcass 12. Typically, the carcass 12 is transported to the hide removal station by a carcass conveyor 16, suspended therefrom by its hind legs.

Thus, the carcass 12 may arrive at the hide removal station with the hide 14 attached to the tail, back portions, head and shoulder regions and, perhaps, the front legs as generally shown in FIGS. 1 and 2. At the hide removal station, a downpuller is typically used to remove the hide 14. Downpullers are generally positioned beneath the conveyor 16 where they receive a detached flap portion of the hide 14, pull downwardly thereon and forcibly remove the hide 14 by pulling the hide 14 over the head. In preparing the carcass 12 for the downpuller it is thus desirable to remove the hide 14 from the tail and back portions of the carcass 12 so that a detached flap portion of the hide 14 hangs downward over the head for receipt by the downpuller. This may be accomplished manually, e.g., by operators using rotary knives or other trimming tools. In some processing lines, processing perhaps 250 carcasses per hour, this has required the services of several operators, each of whom is subjected to a dangerous and unpleasant working environment. In addition, handling by several operators, who may not sterilize their trimming tools between carcasses 12, creates a potential for product contamination. Finally, manual trimming may reduce plant yield due to excessive meat removal or damage to the hides 14 which are also commercially valuable products.

The apparatus 10 of the illustrated embodiment reduces the need for such manual trimming. The apparatus 10 comprises first and second peeling members 18 and 20 which enter a gap 22 previously formed between the carcass 12 and the hide 14. The members 18 and 20 comprise, for example, elongated rods such as steel rods having a length sufficient to accommodate movement of the carcass 12 during removal of the hide 14 as will be understood from the following description. The second member 20 is longer than the first member 18 in the illustrated embodiment to allow peeling of broader sections of the hide 14, however, the dimensions may be varied according to variations in preliminary hide removal, line speed, carcass orientation, or other factors.

The members 18 and 20 enter the gap 22 as the carcass 12 is transported past the apparatus 10. The gap 22 is located generally on the back of the carcass 12 between the neck and tail and, preferably, near the small of the back. The gap 22 may be formed, for example, as a result of preliminary manual hide removal. The members 18 and 20 may enter the gap 22 as a result of movement of either the carcass 12 and/or the members 18 and 20. In the illustrated embodiment, the members 18 and 20 enter the gap 22 as a result of movement of the gap 22 due to movement of the carcass 12 along with the conveyor 16. This is accomplished by positioning the gap 22 so that the members 18 and 20 are longitudinally received therein.

Figure 3:
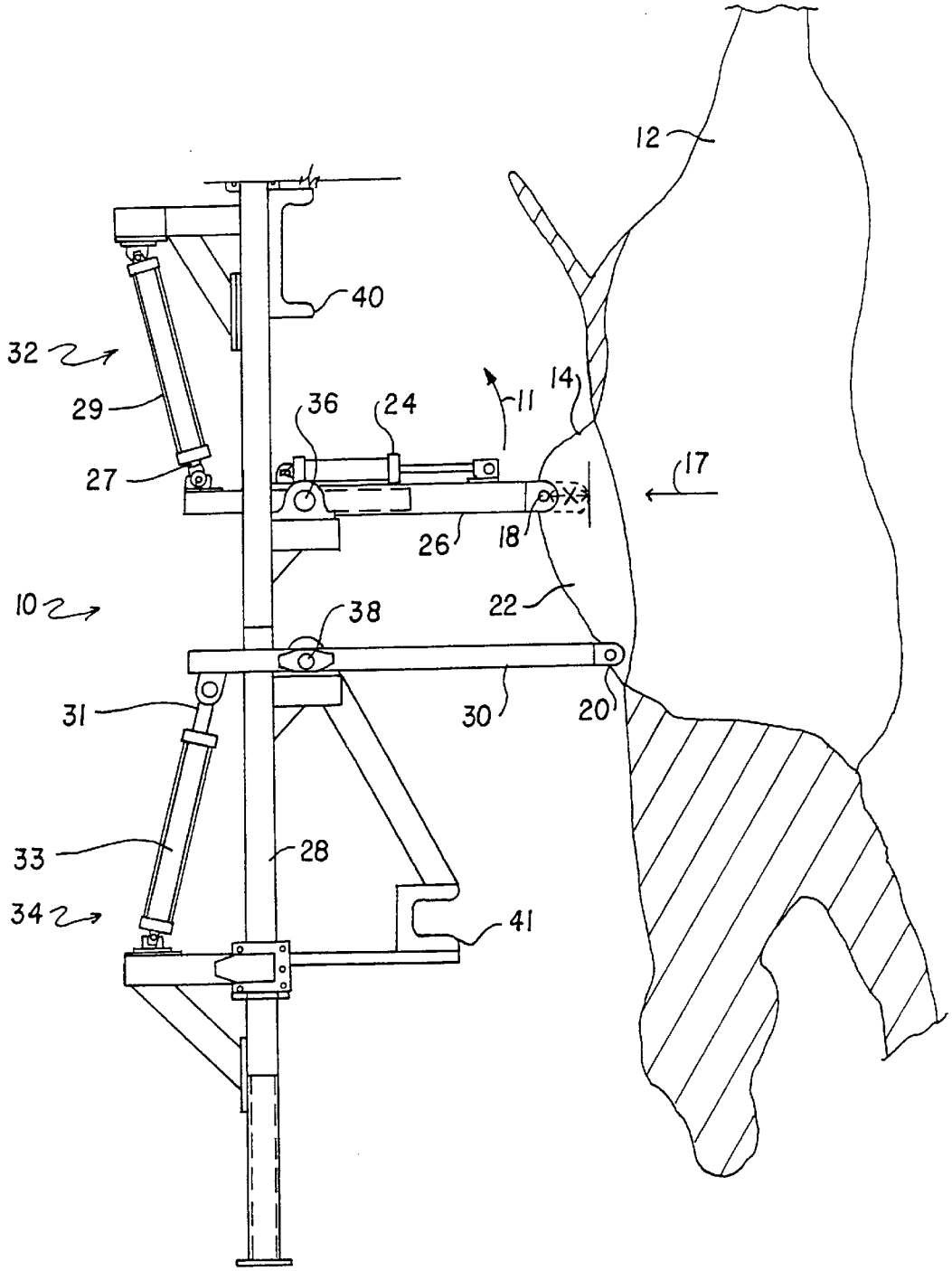
FIG. 3 is a side elevation of the apparatus of FIG. 1 in a withdrawn position.

Referring to FIG. 3, after the gap 22 receives the members 18 and 20, the first member 18 is withdrawn a distance x away from the carcass 12 in a direction generally indicated by an arrow 17. It has been found advantageous to move the first member 18 away from the carcass 12 in addition to moving the member 18 towards the tail in an arcuate direction generally indicated by an arrow 11, as will be described below. If the first member 18 is moved towards the tail in the direction 11 without moving the member 18 away from the carcass 12 in the direction 17, the tail may be flipped allowing dispersion of fecal matter and possible contamination of the carcass 12. Moving the first member 18 away from the carcass 12 in the direction 17 before moving in the direction 11 reduces the tendency of the tail to flip and improves food product hygiene. Although the distance x of movement may vary due to such things as orientation of the carcass 12 and rate of movement of the first member 18 towards the tail, satisfactory results have been achieved by withdrawing the first member 18 a distance x of a few inches.

The first member 18 is moved away from the carcass 12 in the direction 17 by a suitable retraction means 24. The retraction means 24 may comprise, for example, a pneumatic, hydraulic or other cylinder motor to move the first member 18 from an extended position (shown in phantom) in the direction 17 to a retracted position. In the illustrated embodiment, the retraction means 24 comprises a cylinder motor operatively associated with a retractable arm 26 such as a telescoping arm. As will be understood from the description below, the illustrated configuration allows both retraction in the direction 17 and deflection in the direction 11 of the arm 26. Although the arm 26 is retracted before being deflected in the illustrated embodiment, a different sequence including, for example, simultaneous retraction and deflection, could be utilized to achieve the desired peeling of the hide 14 with reduced tail flip.

Figure 4:
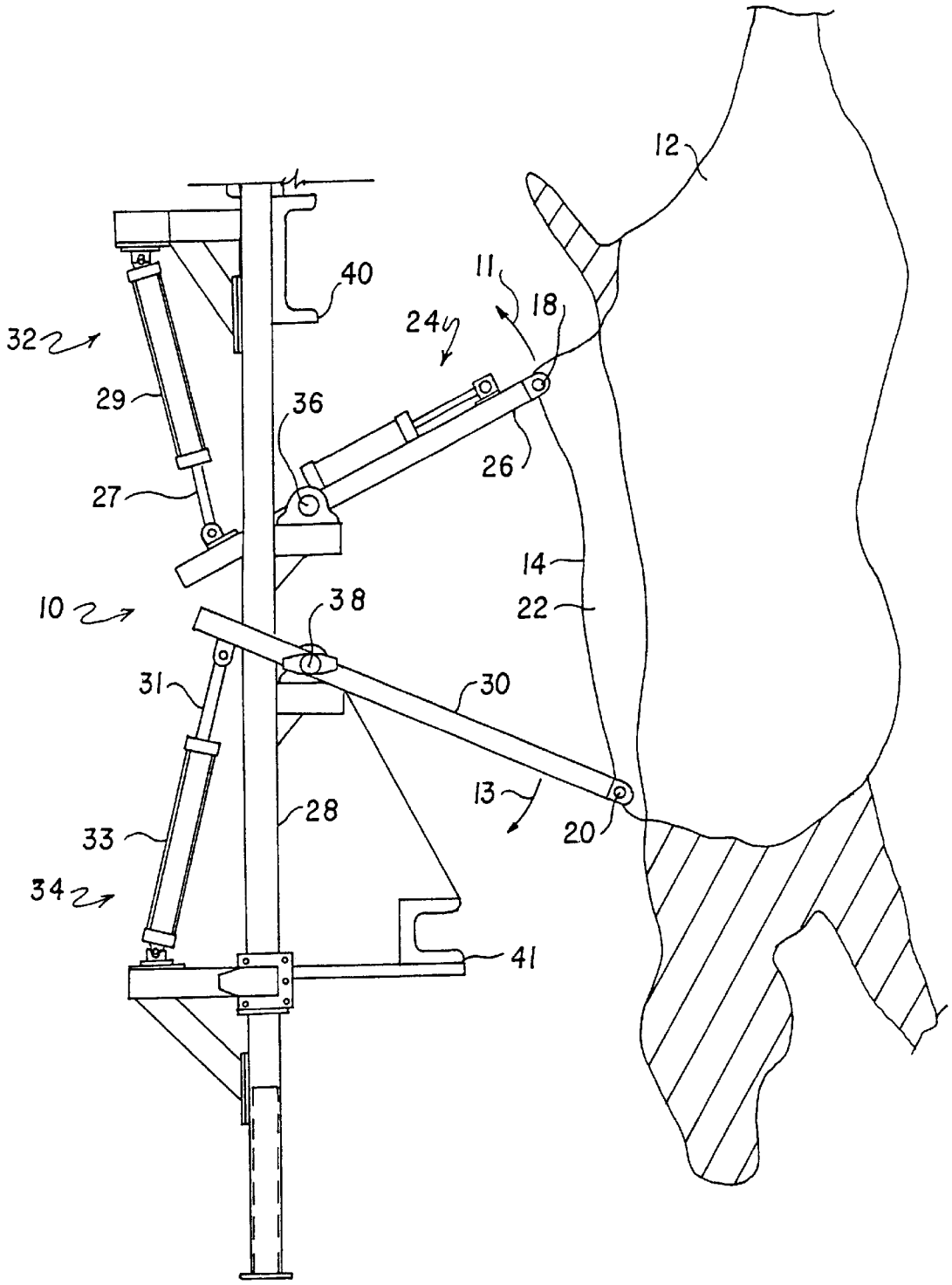
FIG. 4 is a side elevation of the apparatus of FIG. 1 in a partially deflected position.

Referring to FIG. 4, the hide 14 is peeled from the carcass 12 by moving the first member 18 towards the tail in the direction 11 and moving the second member 20 towards the neck in an arcuate direction generally indicated by an arrow 13. It is desirable that such movement in the directions 11 and 13 conform generally to the contour of the back of the carcass 12 so that the distance between carcass 12 and the members 18 and 20 is reduced, thereby facilitating peeling while reducing the likelihood of longitudinal stretching of the hide 14. In addition, it is desirable that the members 18 and 20 be in synchronized simultaneous motion thereby providing opposing forces to assist in peeling of the hide 14.

In the embodiment of FIGS. 1–5, the first and second members 18 and 20 are pivotally mounted on a frame 28 through the first arm 26 and a second arm 30, respectively. First and second deflection means 32 and 34 are provided to pivot the arms 26 and 30 about horizontal axes indicated as first and second points 36 and 38, respectively. The deflection means 32 and 34 may comprise, for example, a pneumatic, hydraulic or other motor. As can be seen by comparison of FIGS. 3–5, deflection of arms 26 and 30 results as cylinder rods 27 and 31 are extended from cylinders 29 and 33 causing the arms 26 and 30 to pivot about axes 36 and 38. As illustrated, the deflection means 32 and 34 comprise cylinders 29 and 33 hingedly disposed between the frame 28 and the arms 26 and 30 to pivot the arms 26 and 30 about the axes 36 and 38. In FIG. 4, the arms 26 and 30 are shown in a partially deflected position. As the members 18 and 20 expand the gap 22 towards the tail and the neck, a force is exerted which is effective to peel the hide 14 from the tail and back portions of the carcass 12.

Although not shown, it is to be understood that other means could be utilized to impart the desired motion to the members 18 and 20. For example, the members 18 and 20 could be driven along a track or a single motor means could be used to move both members.

Referring again to FIG. 1, a triggering means, the position of which is generally identified by an arrow 39, may be employed to synchronize retraction of the arm 26 and/or deflection of the arms 26 and 30 with movement of the carcass 12 along the conveyor 16. In this manner, the arm 26 may be retracted and arms 26 and 30 may be deflected responsive to a signal indicative of the position of the carcass 12. The triggering means 39 may comprise, for example, a limit switch which is tripped by the carcass 12 or the conveyor 16 indicating that the carcass 12 is appropriately positioned for removal of the hide 14. Although the specific embodiment described employs a single limit switch, it will be understood that other types and arrangements of triggering means 39 could be employed. For example, the triggering means 39 could comprise a radiation sensor, such as an electric eye, or a magnetic sensor.

Figure 5:
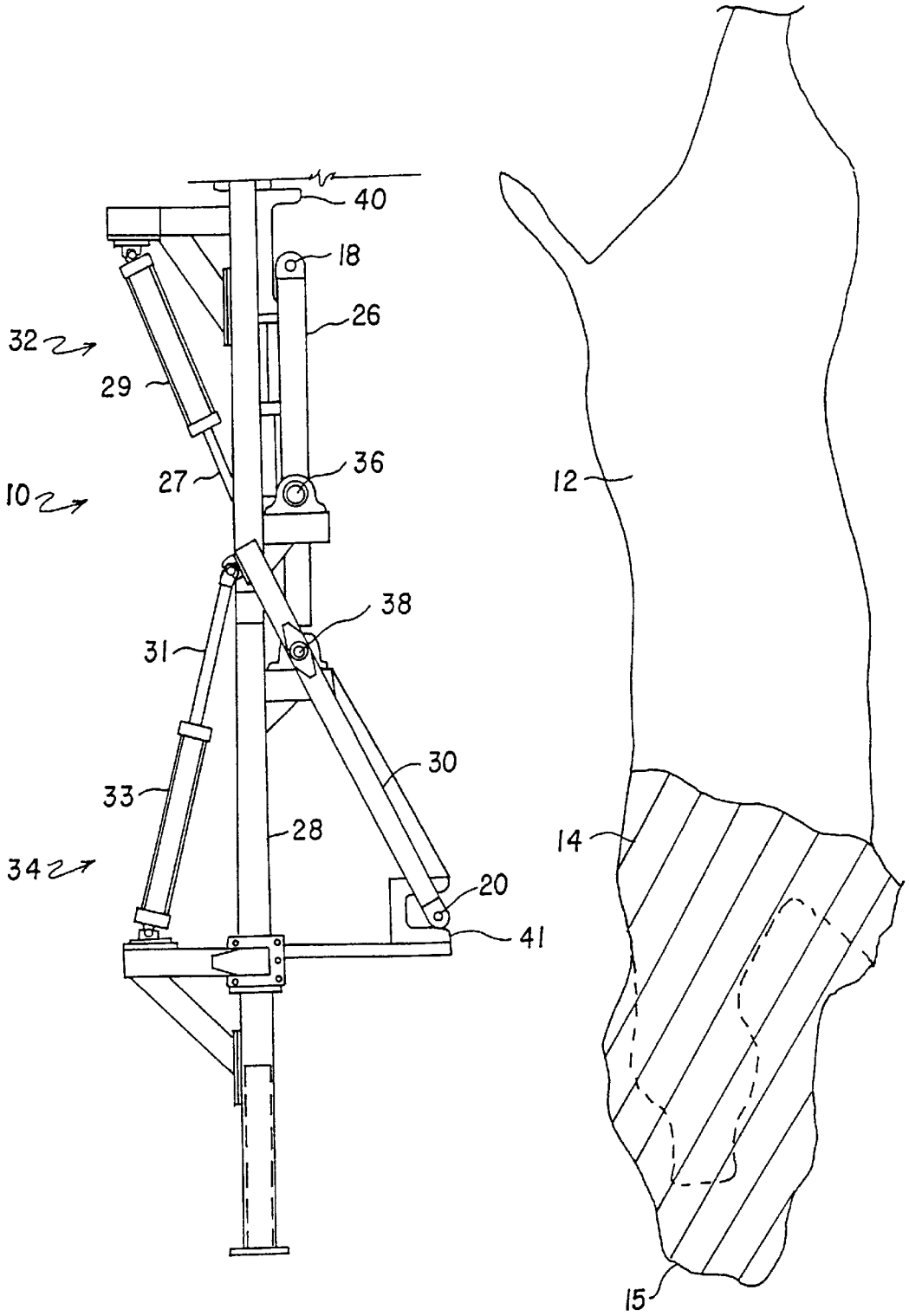
FIG. 5 is a side elevation of the apparatus of FIG. 1 in a fully deflected position.

Referring to FIG. 5, the members 18 and 20 are shown in a fully deflected position. The movement of the members 18 and 20 has removed the hide 14 from the tail and back portions of the carcass 12 from the tail to the shoulder or neck regions thereby allowing a removed hide portion 15 to hang downwardly, e.g., for receipt by a downpuller. In the fully deflected position, the members 18 and 20 enter sterilizers 40 and 41 to at least partially disinfect the members 18 and 20. It is desirable to disinfect the members 18 and 20 between successive hide removal operations to prevent cross-contamination of the carcasses. The sterilizers 40 and 41 may comprise, for example, housings wherein the members 18 and 20 are subjected to heat treatment, disinfectant spraying, steaming or other appropriate disinfection. After such treatment, the members 18 and 20 are returned to the position as shown in FIG. 1 in preparation to start the sequence described above for another hide removal.

Figure 6:
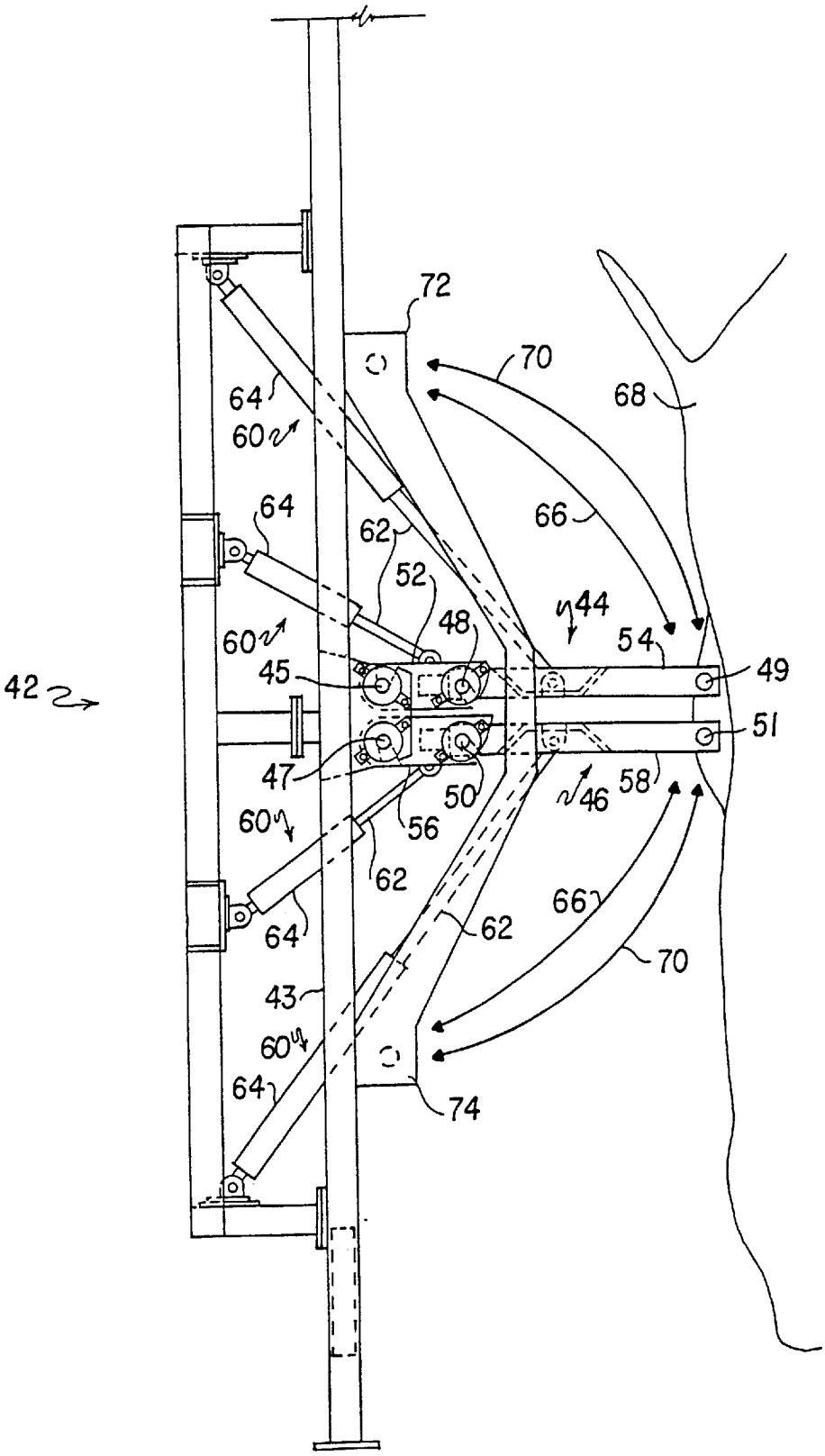
FIG. 6 is a side elevation of an apparatus constructed in accordance with another embodiment of the present invention.

Referring to FIG. 6, another embodiment of an apparatus constructed in accordance with the present invention is generally identified by the reference numeral 42. In this embodiment, arms 44 and 46 on which peeling members 49 and 51 are mounted comprise joints 48 and 50 respectively. The arms 44 and 46 are pivotally mounted on a frame 43 at horizontal axes indicated by points 45 and 47, respectively. Thus, the arm 44 comprises an inner section 52 which is pivotally attached to an outer section 54 at the joint 48. Similarly, the arm 46 comprises an inner section 56 which is pivotally attached to an outer section 58 at joint 50. The inner sections 52 and 56 and outer sections 54 and 58 are each interconnected to a deflection cylinder 60 such that pivotal deflection occurs when cylinder rods 62 are withdrawn into the cylinders 64.

The deflection cylinders 60 may be employed such that the outer sections 54 and 58 pivot about joints 48 and 50 as the inner sections 52 and 56 pivot about the axes 45 and 47. Thus, the peeling members may describe non-circular arcs 66 which are generally more distant from the carcass 68 than circular arcs 70 which would result if the arms 44 and 46 were not jointed. The movement of the peeling members 49 and 51 along the arcs 66 generally conforms to the contour of the back of a carcass 68 and has been found effective to reduce the tail flip problem previously described above. In addition, it is believed that movement along the arcs 66 rather than the circular arcs 70 will result in less removal of fat from the carcass 68 thereby increasing efficiency. Sterilizers 72 and 74, similar to those described in connection with the previous embodiment, may be provided to sterilize the peeling members 49 and 51 between hide pulling operations.

Although not shown, it is to be understood that the cylinders 60 could be employed sequentially rather than simultaneously such that, for example, the cylinders 60 connected to the inner sections 52 and 56 are deployed prior to the cylinders connected to the outer sections 54 and 58.

In operation, the present invention provides a method and apparatus for removing a hide 14 from the tail and back portion of a carcass 12 which reduces manual handling. First and second peeling members 18 and 20 are positioned within a gap 22 formed between the carcass 12 and hide 14 generally on the back portion of the carcass 12 as shown in FIGS. 1 and 2. The first member 18 is moved away from the carcass 12 a distance x in the direction 17 as shown in FIG. 3. The members 18 and 20 are moved towards the tail in the direction 11 and towards the neck in the direction 13, respectively, as shown in FIG. 4, thereby peeling the hide 14 from the carcass 12 and providing a downwardly hanging detached hide portion 15. In the fully deflected position, the members 18 and 20 enter sterilizers 40 and 41 as shown in FIG. 5 to reduce the likelihood of cross-contamination between the carcasses. The members 18 and 20 are then returned to the position shown in FIG. 1 in preparation for another hide removal operation.

The present invention has a number of advantages over the manual trimming procedures employed in accordance with the prior art. First, the present invention reduces manual handling requirements, relative to such prior art trimming procedures, thereby reducing hazardous working conditions thus enhancing safety and reducing labor requirements.

The present invention also improves product hygiene. The reduced manual handling requirement reduces the likelihood of product contamination from the operator's tools. In addition, the sterilizers 40 and 41 which are employed between successive hide removal operations reduce the likelihood of cross-contamination of the carcasses. Moving the first member 18 away from the carcass 12 to reduce tail flip also assists in reducing contamination.

Finally, the present invention improves slaughterhouse efficiency. The method and apparatus of the present invention is capable of removing the hide from back portions of at least 400 carcasses per hour. Moreover, the present invention reduces the meat waste and hide damage associated with current rotary knives or other manual trimming tool techniques.

Although the present invention has been described with respect to specific embodiments thereof, various changes and modifications may be suggested to one skilled in the art, and it is intended that the present invention encompass such changes and modifications as fall within the scope of the appended claims.

What is claimed is:

1. An apparatus for removing a hide from a back portion and tail of an animal carcass, comprising:

first and second elongated members pivotally mounted on a frame, said members positioned to enter a gap between the hide and the carcass near a small of the carcass' back; and means for moving said first member towards the tail and said second member towards a neck of the carcass, wherein the hide is peeled from the carcass.

2. The apparatus of claim 1, wherein said members comprise metal rods.

3. The apparatus of claim 1, wherein said members are mounted on pivot arms and said means for moving comprises a motor to pivot said arms.

4. The apparatus of claim 3, further comprising:

joints between said members and the frame to allow said arms to pivot about said joints; and means for pivoting said arms about said joints.

5. The apparatus of claim 1, further comprising:

a carcass conveyor to move said carcass to the apparatus so that said members enter said gap.

6. The apparatus of claim 1, further comprising triggering means associated with said frame to synchronize movement of said members with a selected position of said carcass.

7. The apparatus of claim 6, wherein said triggering means comprises:

a limit switch to initiate said movement of said members.

8. The apparatus of claim *1,* further comprising a sterilizer associated with said frame to sterilize said members.

9. The apparatus of claim 8, wherein said sterilizer comprises a housing positioned to receive said members after the hide is peeled from the carcass.

10. The apparatus of claim 1, further comprising:

means for moving said first member away from said carcass.

11. The apparatus of claim 10, wherein said means for moving said first member away from said carcass comprises:

a retractable arm; and a retractable cylinder to retract said arm.

12. The apparatus of claim 10, wherein said means for moving said first member away from said carcass comprises:

a jointed arm; and a retractable cylinder to pivot said arm about the joint.

13. The apparatus of claim 1, further comprising:

means for simultaneously moving said first member away from said carcass and generally towards said tail.

14. The apparatus of claim 13, wherein said means for simultaneously moving comprises:

a jointed arm pivotally mounted on a frame comprising an inner portion, an outer portion, and a joint between the portions;

a first retractable cylinder to pivot said inner portion; and a second retractable cylinder to pivot said outer portion about said joint.

15. The apparatus of claim 1, further comprising:

means for simultaneously moving said second member away from said carcass and generally towards said neck.

16. The apparatus of claim 15, wherein said means for simultaneously moving comprises:

a jointed arm pivotally mounted on a frame comprising an inner portion, an outer portion, and a joint between the portions;

a first retractable cylinder to pivot said inner portion; and a second retractable cylinder to pivot said outer portion about said joint.

17. A method for removing a hide from a back portion and tail of an animal carcass, comprising the steps of:

positioning first and second peeling members in a gap formed between the hide and the carcass, said gap located between the carcass' tail and neck; and moving said first member in a first direction towards the tail and said second member in a second direction towards said neck thereby peeling the hide from the back portion and tail of the carcass.

18. The method of claim 17, wherein said step of positioning comprises placing said first and second members in a path of said gap as the carcass moves on a conveyor.

19. The method of claim 17, wherein said step of moving comprises pivoting said members to conform generally to a contour of the carcass.

20. The method of claim 17, further comprising the step of:

a disinfecting said members after said step of moving.

21. The method of claim 17, further comprising the step of:

moving said first member in a third direction away from the carcass before said step of moving in said first direction.

22. The method of claim 17, further comprising the step of:

moving said first member in a third direction away from the carcass simultaneously with said step of moving in said first direction.

23. The method of claim 17, further comprising the steps of:

generating a signal indicative of carcass position; and initiating said step of moving responsive to said step of generating.

24. The method of claim 17, further comprising the step of:

pivoting said members about joints during said step of moving.

25. A method for removing a hide from a back portion and tail of an animal carcass, comprising the steps of:

suspending the carcass from a conveyor such that a longitudinal axis through the carcass is generally vertical;

forming a gap between the hide and the carcass near a small of the back;

positioning said gap such that first and second peeling members are received within said gap due to lateral movement of the carcass; and pivotally moving said first member toward the tail and said second member towards a neck of the carcass, wherein the hide is peeled from the carcass.

26. The method of claim 25, further comprising the step of:

continuing to pivot said members into a disinfecting housing.

27. The method of claim 25, further comprising the steps of:

generating a signal indicative of carcass position; and initiating said step of pivotally moving responsive to said step of generating.

*28. An apparatus for removing a hide from a back portion of an animal carcass, said animal carcass suspended from a conveyor for conveying said carcass in a first direction, said apparatus comprising:*

*at least one elongated member pivotally mounted on a frame, said member positioned to enter a gap between the hide and the carcass near a small of the carcass's back; and*

*means for moving said at least one member towards the neck of the carcass, wherein the hide is peeled from the carcass.*

*29. The apparatus of claim 28, further comprising:*

*means for moving said at least one member away from said carcass.*

*30. The apparatus of claim 28, wherein said drive means drives said peeling member a predetermined arcuate path alone said back portion of said suspended carcass.*

*31. The apparatus of claim 28, further comprising a sterilizer associated with said frame to sterilize said at least one member.*

*32. An apparatus for removing hide from a back portion of an animal carcass, said animal carcass suspended from a conveyor for conveying said carcass in a first direction in a substantially vertical plane, said apparatus comprising:*

*an elongated member mounted on a frame, said member positioned to enter a gap between the hide and the carcass near a small of the carcass's back;*

*means for moving said elongated member, wherein said hide is peeled from said back portion of said carcass by said elongated member when said elongated member is moved towards the neck of the carcass; and*

*a triggering means associated with said frame to synchronize movement of said member with a selected position of said carcass.*

*33. The apparatus of claim 32, further comprising a sterilizer associated with said frame to sterilize said member.*

*34. An apparatus for removing hide from a back portion of an animal carcass, said animal carcass having a hide, a back and a neck suspended from a conveyor for conveying said carcass, said apparatus comprising:*

*an elongated member pivotally mounted on a frame, said member positioned to enter a gap between the hide and the carcass near the small of the carcass's back;*

*means for moving said member towards the neck of the carcass wherein the hide is peeled from the carcass; and*

*a sterilizer associated with said frame to sterilize said member.*

*35. A method for removing hide from a back portion of an animal carcass suspended from a conveyor for conveying said carcass in a first direction in a substantially vertical plane, comprising the steps of:*

*positioning at least one peeling member in a gap formed between the hide and the carcass, said gap located between the carcass' tail and neck; and*

*moving said at least one member in a direction towards the neck of the animal carcass, thereby peeling the hide from the back portion of the carcass.*

*36. The method of claim 35, wherein said step of moving said peeling device from said first position to said second position along said first predetermined path comprises moving said peeling device along a substantially arcuate path.*

* * * * *